United States Patent [19]

Lewis

[11] 4,296,447
[45] Oct. 20, 1981

[54] MAGNETIC RECORDING AND REPRODUCTION

[75] Inventor: John A. Lewis, Southampton, England

[73] Assignee: Racal Recorders, Ltd., Bracknell, England

[21] Appl. No.: 102,540

[22] Filed: Dec. 11, 1979

[30] Foreign Application Priority Data

Dec. 11, 1978 [GB] United Kingdom ............... 47983/78

[51] Int. Cl.³ .............................................. G11B 5/30
[52] U.S. Cl. .................................... 360/113; 324/252; 338/32 R
[58] Field of Search ................. 360/113, 125, 126–127, 360/66–67; 338/32 R; 324/252

[56] References Cited

U.S. PATENT DOCUMENTS

| | | | |
|---|---|---|---|
| 3,860,965 | 1/1975 | Voegeli | 360/113 |
| 3,864,751 | 2/1975 | Beaulieu et al. | 360/113 |
| 4,050,086 | 9/1977 | Harr | 360/113 X |
| 4,179,720 | 12/1979 | Miura | 360/113 |
| 4,191,977 | 3/1980 | Lewkowicz | 360/113 X |

OTHER PUBLICATIONS

IBM/TDB, vol. 15, No. 9, Feb. 1973, "Balanced Magnetic Head" by O'Day.

Primary Examiner—John H. Wolff

[57] ABSTRACT

A magnetic tape recording head comprises a strip of magneto-resistive material whose magnetic field/resistance change characteristic is in the form of two mirror image nonlinear curves starting at the origin of the graph. The strip is energized with a constant current and the voltage across it is fed to two sample and hold circuits. These are respectively triggered by antiphase pulses and the samples from the two sample and hold circuits are fed to the respective inputs of a differential amplifier. A bias conductor alongside the magneto-resistive strip is energized with pulses having the same polarity as, and synchronous with, the sampling pulses so as to bias the strip to predetermined points which are alternately on the positive and negative parts of the graph. The overall effective characteristic is therefore the sum of one part of the graph and the inverted other part, and is substantially linear.

9 Claims, 5 Drawing Figures

4,296,447

MAGNETIC RECORDING AND REPRODUCTION

BACKGROUND OF THE INVENTION

The invention relates to the magnetic recording and reproduction (or replaying) of information, and more specifically relates to means for reproducing magnetically stored data, such as data stored on a magnetic recording tape.

It is known to use a reading head incorporating a magneto-resistive element for reading magnetically stored information, such a head using the magneto-resistive effect, that is, the dependence of electrical resistance on the state of magnetisation which is exhibited by certain ferromagnetic alloys. It is also known to use, in such heads, magneto-resistive material in the form of a thin film. A problem with such heads, however, is that the electrical output is not linearly related to the magnetic input from the medium on which the data being read is magnetically stored. The system now to be described is concerned with obviating or reducing the effect of this non-linearity.

An object of this invention therefore is an improved system for reproducing signals stored magnetically on a magnetic storage medium.

A more specific object of this invention is an improved system for reproducing signals stored magnetically on a magnetic storage medium having a reading head using the magneto-resistive effect.

BRIEF SUMMARY OF THE INVENTION

According to the invention, there is provided a system for reproducing signals stored magnetically on a magnetic storage medium, comprising magneto-electric transducing means having a predetermined input/output characteristic relating changes in its electrical output to changes in the magnetic field produced on it by the stored signals when it is mounted in juxtaposition to the magnetic storage medium, biasing means for alternately biasing the transducing means to first and second predetermined operating points on its characteristic so that the transducing means produces a succession of first outputs dependent on the strength of the field produced by the stored signals in relation to the field represented by the first operating point and a succession of second outputs, interspersed with the first outputs, dependent on the strength of the field produced by the stored signals in relation to the field represented by the second operating point, and output means for producing a composite output from the succession of first and second outputs, the first and second operating points being selected such that the composite output is more linearly related to the strength of the stored signals than are either the first or the second outputs.

According to the invention, there is also provided a system for reproducing signals stored magnetically on a magnetic storage medium, comprising magneto-resistive means having a predetermined characteristic relating its change in resistance produced by a magnetic field having a predetermined orientation in relation to it to the magnitude of that field and having first and second regions in one of which a change in a predetermined direction of the magnitude of a said magnetic field produces a change in the said resistance in one direction and in the other of which a change in the said predetermined direction of the magnitude of the same magnetic field produces a change in the said resistance in the opposite direction and of substantially the same amount, means mounting the magneto-resistive member adjacent to the magnetic storage medium whereby the signals stored thereon produce a magnetic field having the said predetermined orientation, biasing means alternately biasing the magneto-resistive member to operate from respective operating points in the first and second regions of the characteristic, first output means operative each time the magneto-resistive member is biasing to the operating point on the said first region to produce a first output representing the sign and magnitude of the difference (if any) in the resistance of the magneto-resistive member at that time compared with the resistance thereof corresponding to that operating point, second output means operative each time the magneto-resistive member is biasing to the operating point in the said second region to produce a second output representing the sign and magnitude of the difference (if any) between the resistance of the magneto-resistive member at that time and the resistance thereof corresponding to that operating point, and means for inverting the second outputs in relation to the first outputs to produce a composite output in which the effects of non-linearities in the two said regions of the characteristic tend to cancel each other.

DESCRIPTION OF THE DRAWINGS

A system embodying the invention for reading (that is, replaying or reproducing) magnetically stored signals will now be described with reference to the accompanying drawings in which.

DESCRIPTION OF PREFERRED EMBODIMENTS

Figure 1:
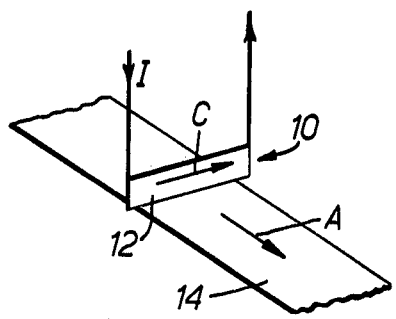
FIG. 1 is a diagrammatic perspective view of a reading head incorporating a magneto-resistive member, the member being shown positioned adjacent to a magnetic tape on which are stored the signals to be read.

As shown in FIG. 1, the system has a magnetic reproducing head 10, the operative part of which is a magneto-resistive member 12. The member 12 is in the form of a thin film (generally a single magnetic domain) of a ferromagnetic alloy which exhibits a dependence of its electrical resistance on its state of magnetisation (the magneto-resistive effect). The member 12 is in the form of a strip of the material on a wear-resistant substrate. The same substrate may carry a plurality of these members to give a multi-transducer assembly. As shown in FIG. 1, the member 12 is mounted vertically, that is, perpendicular to the magnetic recording tape 14 on which are magnetically stored the signals to be reproduced by the head 10. The tape moves past the head in the direction of the arrow A.

The head responds to the magnetic field produced by the recorded signals and acting vertically in relation to the member 12. The strength of this vertical field affects the electrical resistance of the member 12 in the direction of its easy axis of magnetisation (arrow C). The electrical resistance of the member in this direction may be measured by, for example, passing a constant current I through it (as shown diagrammatically in FIG. 1) and measuring the voltage produced across the member.

Figure 2:
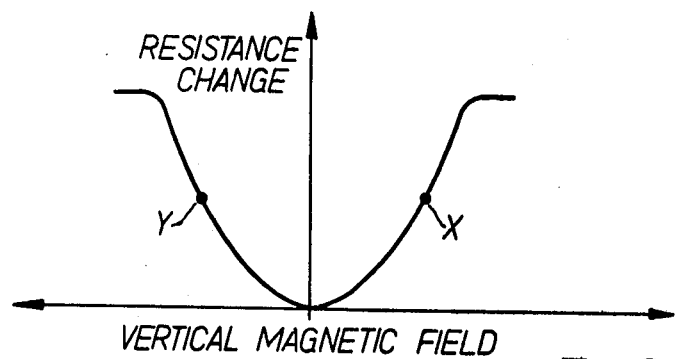
FIG. 2 is a graph showing the input/output characteristic of the element of FIG. 1.

FIG. 2 shows the characteristic of the magneto-resistive member 12. The vertical axis in FIG. 2 represents the change in electrical resistance (measured along the length of the member). The horizontal axis, to the right in FIG. 2 from the origin O, represents the strength of the magnetic field acting in one vertical direction while the horizontal axis to the left represents the strength of the magnetic field acting in the opposite vertical direction. The characteristic shows that the change in resistance increases with the strength of the magnetic field, but that the relationship is not linear.

Figure 3:
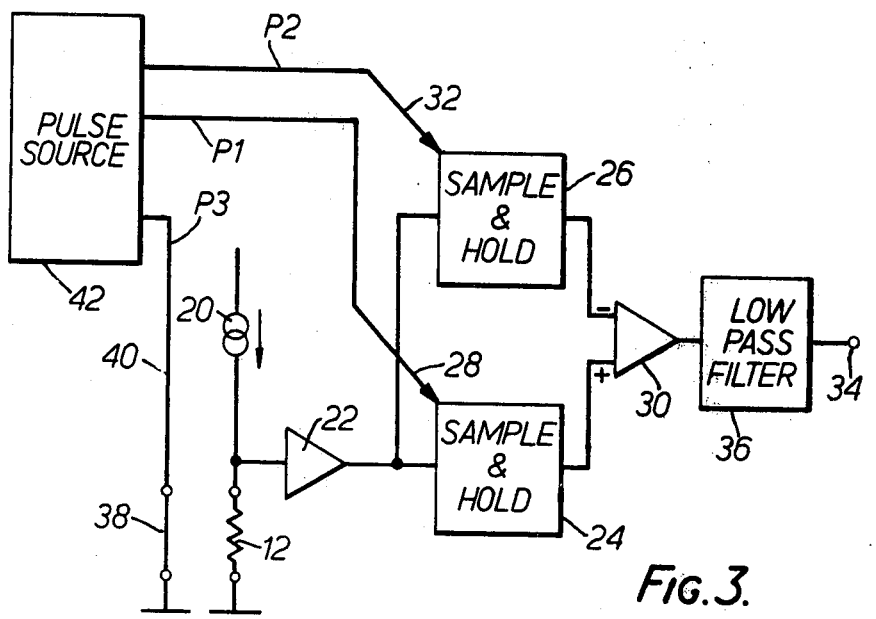
FIG. 3 is a block circuit diagram of the system.

FIG. 3 shows the circuit diagram of the system. As shown, the magneto-resistive member 12 is connected in series with a constant current source 20, and the voltage developed across the member 12 is fed into and amplified by a linear preamplifier 22 and then fed in parallel to the input of two sample and hold circuits 24 and 26. Sample and hold circuit 24 has a control line 28. When line 28 is momentarily pulsed (in a manner to be explained), the circuit 24 samples the level of the output of amplifier 22 (which level represents the resistance of the magneto-resistive member 12), and this signal level is stored until the next sampling pulse occurs-at which time the output of amplifier 22 is re-sampled and stored. The circuit 24 applies the stored level to the positive input of a differential amplifier 30.

The sample and hold circuit 26 operates in a similar manner in dependence on sampling pulses which are received on a line 32. The level stored by the circuit 26 is applied to the negative input of the differential amplifier 30.

The amplifier ouput is fed to an output terminal 34 through a low pass filter 36.

Associated with the magneto-resistive member 12, and placed physically adjacent to it in the head 10 (but not shown in FIG. 1), is a bias conductor 38 which is energised by a line 40.

The sampling control lines 28 and 32 and the bias supply line 40 are connected to be energised by a pulse source 42. The pulse source 42 energises line 28 with a train of sampling pulses P1, energises the line 32 with a train of sampling pulses P2, and energises the bias supply line 40 with a train of biasing pulses P3. The waveforms of the pulse trains P1, P2 and P3 are shown in FIG. 4.

Figure 4:
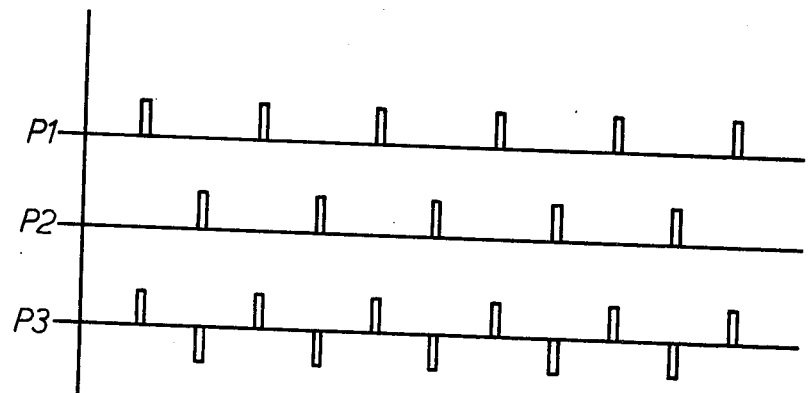
FIG. 4 shows electrical pulse trains occurring in the system.

As shown in FIG. 4, the pulse train P3 consists of a succession of positive and negative pulses. Each positive pulse is sized so as to cause the bias conductor 38 to produce a magnetic field acting on the member 12 of such magnitude as to bias the member to point X on its characteristic (see FIG. 2 and also I in FIG. 5 where the characteristic is repeated). Shown at II in FIG. 5, therefore, is the effective voltage/field characteristic of the member 12 while each positive bias pulse is being applied to the conductor 38; the voltage is the voltage developed across the member 12 by the constant current I in dependence on the member's instantaneous resistance, and this resistance depends on the vertical field produced by the signals stored on the magnetic tape 14. Therefore, as shown at II in FIG. 5, for a magnetic field having a predetermined vertical direction (e.g. vertically upwards), and produced from the magnetic storage tape 14 in dependence on the stored signals, the voltage produced by amplifier 22 increases in a positive direction as the field strength increases.

Figure 5:
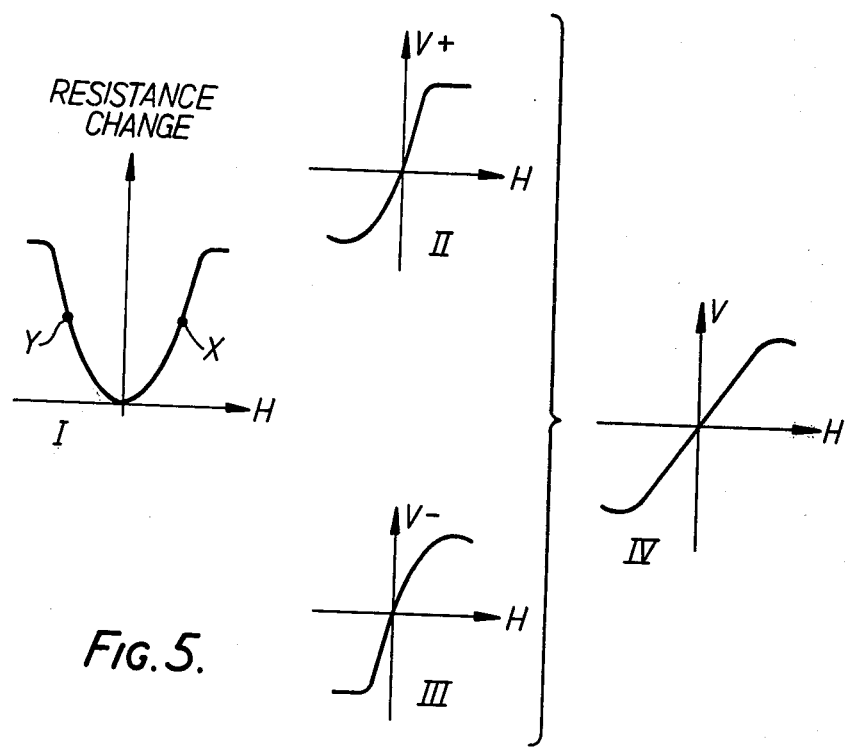
FIG. 5 is a series of graphs illustrating the operation of the system of FIG. 4.

Each negative bias of pulse train P3 energises the bias conductor 38 in the opposite direction, and is of such magnitude as to cause the conductor to bais the magneto-resistive member 12 to point Y on its characteristic (see I in FIG. 5). Point Y corresponds to point X but is on the negative part of the characteristic. Therefore, for the duration of each negative bias pulse, the member 12 has the voltage/field characteristic shown at III in FIG. 5. This shows that, for a vertical field having the same direction as that represented by the horizontal axis to the right in the characteristic shown at II in FIG. 5, the voltage produced by amplifier 22 increases negatively as the field strength increases.

The points X and Y are selected in relation to the characteristics of the member 12 so as to be respectively situated at the centres of substantially linear regions of the characteristic, though it is clear from the characteristics shown at I, II and III in FIG. 5 that these regions are not completely linear.

As shown in FIG. 4, the pulses of pulse train P1 have half the frequency of the pulses P3 and are in phase with the positive pulses P3. Therefore, each pulse P1 causes the sample and hold circuit 24 to sample and store the voltage level produced by the amplifier 22 in accordance with the characteristic shown at II in FIG. 5. The resultant voltage levels are amplified in amplifier 30 and applied to the filter 36.

The pulses of pulse train P2 also have half the frequency of the pulses P3 but are in the phase with the negative pulses P3. Therefore, in response to each pulse P1 the sample and hold circuit 26 samples the voltage produced by the amplfier 22 in accordance with the characteristic shown at III in FIG. 5. The resultant stored voltage levels are again amplified in the differential amplifier 30 (via its negative input this time) and applied to the filter 36.

Assuming, initially, that the field strength produced by the signal stored on the tape 14 is constant, the sample and hold circuit 24 will apply a succession of equal positive voltage levels to the positive input of the differential amplifier 30, while the sample and hold circuit 26 will apply a series of equal negative voltage levels to the negative input of the amplifier 30. The differential amplifier 30 will have the effect of inverting the voltage levels received from the circuit 26 in relation to those received from the circuit 24 and assuming that the characteristics shown at II and III in FIG. 5 match each other (that is, that the left and right hand halves of the characteristics shown in FIG. 2 and at I in FIG. 5 are mirror images of each other), amplifier 30 will produce a constant output dependent on the strength of the recorded signals. If the strength of the recorded signal changes, then of course the output from the amplifier 30 will change correspondingly. The filter 36 smoothes the voltage transitions resulting from any change in voltage level input to amplifier 30 as the sample and hold circuits 24 and 26 are successively energised. The sampling rate should of course be considerably higher than the bandwidth of the recorded signals.

Effectively, therefore, the overall voltage/field strength characteristic is as shown at IV in FIG. 5, that is, the characteristic relating output voltage at terminal 34 to the field strength produced by the recorded signals. Characteristic IV is obtained by summing the characteristics shown at II and III. As the two halves of the basic characteristic shown at I are substantially mirror-images of each other, and as the effect of the differential amplifier 30 is to invert the characteristics shown at III in relation to that shown at II, the result is that the non-linearities in the characteristics II and III are substantially cancelled out in the overall characteristic of IV. Therefore, the result is the production of a substantially distortion-free output. Distortion by even harmonics is eliminated because such harmonics cancel each other out. Odd harmonics may persist but can be compensated without too much difficulty by providing matching non-linearity at a suitable point in the circuitry. There is, therefore, a substantial improvement on the result that would be obtained by biassing in one direction only and using a single sample and hold circuit; in such an arrangement, both even and odd harmonics are produced, and typically, the second and third harmonics can each be of the order of 3%.

The system illustrated is also advantageous by being substantially immune to external factors (e.g. temperature effects) which influence the resistance of the member 12. The change in output of the two sample and hold circuits 24 and 26 which would be produeced by such external factors would be the same, and the common mode rejection produced by the differential amplifier 30 would result in cancellation of the unwanted signal.

The provision of bias by pulsing the bias conductor, instead of continuously energising it, substantially reduces pwoer dissipation in the region of the head.

What is claimed is:

1. A system for reproducing signals stored magnetically on a magnetic storage medium, comprising
   a magneto-resistive member having a predetermined input/output characteristic curve relating changes in the magnetic field which is produced upon it by the stored signals, when it is mounted in juxtaposition to the magnetic storage medium, to the corresponding changes in its electrical resistance,
   biasing means for alternately producing biasing magnetic fields acting in opposite directions but parallel to the magnetic field produced by the stored signals and thereby alternately biasing the magneto-resistive member to first and second predetermined operating points on its characteristic curve, whereby the magneto-resistive member produces a succession of first outputs which are dependent on the strength of the field produced by the stored signals in relation to the field represented by the first operating point and a succession of second outputs which alternate in time with the first outputs and are dependent on the strength of the field produced by the stored signals in relation to the field represented by the second operating point, and
   output means for producing a composite output from the succession of first and second outputs,
   the first and second operating points being selected such that the composite output is more linearly related to the strength of the stored signals than are either the first or the second outputs taken alone.

2. A system according to claim 1, in which the biasing means comprises an electrical conductor physically positioned adjacent to the magneto-resistive member and energisable by an electric current so as to produce the requisite magnetic field for carrying out the biasing.

3. A system according to claim 2, in which the biasing means includes means for successively pulsing the electrical conductor by such currents as to produce the requisite magnetic field.

4. A system according to claim 3, comprising constant current means connected to drive a substantially constant current through the magneto-resistive member whereby the voltage developed across the magneto-resistive member by the said current constitutes the said output of the member and is dependent on its electrical resistance, and
   sample and hold means operative in synchronism with the pulsing of the biasing means and connected to sample the said output of the magneto-resistive member so as to produce the first and second outputs.

5. A system for reproducing signals stored magnetically on a magnetic storage medium, comprising
   a magneto-resistive member having a predetermined characteristic curve relating its change in electrical resistance produced by a magnetic field having a predetermined orientation in relation to it to the magnitude of that field, the said characteristic curve having first and second regions in one of which a change in a predetermined direction of the magnitude of a said magnetic field produces a change in the said resistance in one direction and in the other of which a change in the said predetermined direction of the magnitude of the same magnetic field produces a change in the said resistance in the opposite direction,
   the first and second regions being substantially mirror-images of each other,
   means mounting the magneto-resistive member adjacent to the magnetic storage medium whereby the signals stored thereon produce a magnetic field having the said predetermined orientation,
   biasing means producing magnetic biasing fields acting alternately in opposite directions along the said predetermined orientation and thereby alternately biasing the magneto-resistive member to operate from respective operating points in the first and second regions of the characteristic curve,
   first output means operative each time the magneto-resistive member is biased to the operating point on the said first region to produce a first output representing the sign and magnitude of the difference (if any) in the resistance of the magneto-resistive member at that time compared with the resistance thereof corresponding to that operating point,
   second output means operative each time the magneto-resistive member is biased to the operating point in the said second region to produce a second output representing the sign and magnitude of the difference (if any) between the resistance of the magneto-resistive member at that time and the resistance thereof corresponding to that operating point, and
   means for inverting the second outputs in relation to the first outputs to produce a composite output in which the effects of non-linearities in the two said regions of the characteristic curve tend to cancel each other.

6. A system according to claim 5, in which the first and second output means comprise respective sample and hold circuits operating in synchronism with the biasing means such that the first sample and hold circuit samples a signal representing the resistance of the magneto-resistive member each time the biasing means biases the member to operate from the first operating point, and the second sample and hold circuit samples a signal representing the resistance of the magneto-resistive member each time the biasing means biases the member to operate from the second operating point.

7. A system according to claim 6, including
a differential amplifier, and
means feeding the outputs of the sample and hold circuits to the respective opposite-polarity inputs of the differential amplifier.

8. A system according to claim 6, comprising constant current means connected to drive a substantially constant current through the magneto-resistive member whereby the voltage developed across the said member by the substantially constant current is dependent on the resistance of the said member and constitutes the said signal representing the resistance of the magneto-resistive member.

9. A system according to claim 5 or 6, in which the biasing means comprises an electrical biasing conductor mounted physically adjacent to the magneto-resistive member and energised periodically with an electrical biasing current of such magnitude and polarity as to bias the magneto-resistive member to operate from either the first or the second operating point.

* * * * *